US008359563B2

(12) United States Patent
Abbaspour et al.

(10) Patent No.: US 8,359,563 B2
(45) Date of Patent: Jan. 22, 2013

(54) MOMENT-BASED CHARACTERIZATION WAVEFORM FOR STATIC TIMING ANALYSIS

(75) Inventors: Soroush Abbaspour, Hopewell Junction, NY (US); Peter Feldmann, Yorktown Heights, NY (US); David Ling, Upper Saddle River, NJ (US); Chandramouli Visweswariah, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 12/542,042

(22) Filed: Aug. 17, 2009

(65) Prior Publication Data

US 2011/0041108 A1  Feb. 17, 2011

(51) Int. Cl.
*G06F 9/455* (2006.01)
*G06F 17/50* (2006.01)

(52) U.S. Cl. ........ 716/113; 716/106; 716/107; 716/108; 716/111; 716/112; 703/19

(58) Field of Classification Search .......... 716/106–108, 716/111–115; 703/19
See application file for complete search history.

(56) References Cited

U.S. PATENT DOCUMENTS

| | | | |
|---|---|---|---|
| 5,327,021 A | 7/1994 | Kanai et al. | |
| 6,822,487 B2 | 11/2004 | Tejima et al. | |
| 7,046,014 B2 | 5/2006 | Lu | |
| 7,280,930 B2 | 10/2007 | Kobayashi | |
| 7,861,191 B2 * | 12/2010 | Koch | 716/102 |
| 2004/0243954 A1 * | 12/2004 | Devgan et al. | 716/6 |
| 2008/0222579 A1 * | 9/2008 | Agarwal et al. | 716/4 |

OTHER PUBLICATIONS

"A Novel Moment-Based Methodology for Accurate and Efficient Static Timing Analysis", by Ahmed Shebaita, Dusan Petranovic, Yehea Ismail, @2008 IEEE.*
"Accurate Waveform Modeling using Singular Value Decomposition with Applications to Timing Analysis", by Anand Ramalingham, Ashish Kumar Singh, Sani R. Nassif, Michael Orshansky, David Z. Pan, ACM @2007.*
David D. Ling et al., "A Moment-Based Effective Characterization Waveform for Static Timing Analysis," In Proceedings of the 46th Annual Design Automation Conference, DAC '09, NY, NY, 2009, pp. 19-24.
Peter Feldman et al., "Towards a More Physical Approach to Gate Modeling for Timing, Noise, and Power," In Proceedings of the 45th Annual Design Automation Conference, °DAC '08, NY, NY, 2008, pp. 453-455.
Pinhong Chen et al., "On Convergence of Switching Windows Computation in Presence of Crosstalk Noise," In Proceedings of the 2002 International Symposium on Physical Design, 'ISPD '02, NY, NY, 2002, pp. 84-89.
Ganesh Srinivasan et al., Efficient Test Strategy for TDMA Power Amplifiers Using Transient Current Measurements: Uses and Benefits," In Proceedings of the Conference on Design, Automation and Test in Europe" IEEE Computer Society Washington, DC, USA ©2004, vol. 1, copy consists of 6 unnumbered references.

(Continued)

*Primary Examiner* — Nha Nguyen
(74) *Attorney, Agent, or Firm* — Preston J. Young

(57) ABSTRACT

In one embodiment, the invention is a moment-based characterization waveform for static timing analysis. One embodiment of a method for mapping a timing waveform associated with a gate of an integrated circuit to a characterization waveform includes using a processor to perform steps including: computing one or more moments of the timing waveform and defining the characterization waveform in accordance with the moments.

18 Claims, 4 Drawing Sheets

OTHER PUBLICATIONS

J. Qian, et al., "*Modeling the effective capacitance for the RC interconnect of CMOS gates*," IEEE Transactions on Computer Aided Design of Integrated Circuits and Systems, vol. 13, pp. 1526-1535, 1994.

M. Hashimoto et al., "*Equivalent waveform propagation for static timing analysis*," Proc. of IEEE International Conference on Computer Aided Design, pp. 169-175, 2003.

P. Feldmann et al, "*Driver waveform computation for timing analysis with multiple voltage threshold driver models*," Proc. of ACM/IEEE Design Automation Conference, pp. 425-428, 2008.

I. Keller et al. "*Challenges in gate level modeling for delay and SI at 65nm and below*," Proc. of ACM/IEEE Design Automation Conference, pp. 468-473, 2008.

S. Raja et al., "*Transistor level gatemodeling for accurate and fast timing, noise, and power analysis*," Proc. of ACM/IEEE Design Automation Conference, pp. 456-461, 2008.

N. Menezes et al., "*A true electrical cell model for timing, noise, and power grid verification*," Proc. of ACM/IEEE Design Automation Conference, pp. 462-467, 2008.

"*Motivations and methodology for nanometer library characterization*", Cadence technical paper, www.cadence.com. @2008.

S. Nazarian et al., "*Sensitivity-based gatedelay propagation in static timing analysis*," Proc. International Symposium on Quality of Electronic Design, pp. 536-541, 2005.

D. Blaauw et al., "Slope propagation in static timing analysis," *IEEE Trans. On Computer Aided-Design of Integ. Cir. & Sys.*, pp. 1180-1195, 2002.

A. Jai et al., "*Accurate delay computation for noisy waveform shapes*," Proc. of IEEE International Conference on Computer-Aided Design, pp. 946-952, 2005.

A. R. Conn et al., "*A derivative-free optimization algorithm in practice*," Proceedings of the 7th AIAA/USAF/NASA/ISSMO Symposium on Multidisciplinary Analysis and Optimization, 1988, St. Louis, MO.

A. R. Conn et al., "*On the convergence of derivative-free methods for unconstrained optimization*," Approximation Theory and Optimization, tribute to M. J. D. Powell, ed. M. D. Buhmann and A. Iseries, Cambridge University Press, pp. 83-108, 1997.

A. R. Conn et al., "*Recent progress in unconstrained nonlinear optimization without derivatives*," Journal of Mathematical Programming, vol. 79, pp. 397-414, 1997.

\* cited by examiner

MOMENT-BASED CHARACTERIZATION WAVEFORM FOR STATIC TIMING ANALYSIS

BACKGROUND OF THE INVENTION

The present invention relates generally to design automation, and relates more particularly to static timing analysis of integrated circuit (IC) chips.

For static timing analysis to be efficient, the various constituent gates of a very large scale integration (VLSI) design must have their timing properties pre-characterized. A typical gate library consists of a thousand or more gates, each representing a different logic function, drive strength, transistor topology, or the like. For each of these gates, the timing properties are typically characterized by running repeated simulations for different input waveforms ("characterization waveforms") and different capacitive loads. The resulting gate delays and output slews are then tabulated (or fit) as functions of input slew and output load capacitance.

Once the library is characterized, static timing analysis tools use the pre-computed and tabulated timing properties to time each gate in the design. In particular, the input waveform appearing at the switching input of a gate under analysis ("timing waveform") must be mapped to a characterization waveform. Typically, this mapping is performed by measuring the fifty-percent crossing time and the slew of the timing waveform and then selecting the characterization waveform that matches the measured values (as represented by a saturated ramp that is commonly referred to as the "standard ramp"). The delay and output slew of the gate are then obtained from either function evaluation or table interpolation.

A shortcoming of this conventional approach is that since the timing properties of the gate are treated as dependent on input slew and load capacitance only, all timing waveforms with the same slew will result in the same gate delay and output slew values. In other words, although the actual delays may vary significantly, this approach would assign the same delay value to all of these timing waveforms. This approximation is typically inaccurate and can result in flawed timing analysis.

SUMMARY OF THE INVENTION

In one embodiment, the invention is a moment-based characterization waveform for static timing analysis. One embodiment of a method for mapping a timing waveform associated with a gate of an integrated circuit to a characterization waveform includes using a processor to perform steps including: computing one or more moments of the timing waveform and defining the characterization waveform in accordance with the moments.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
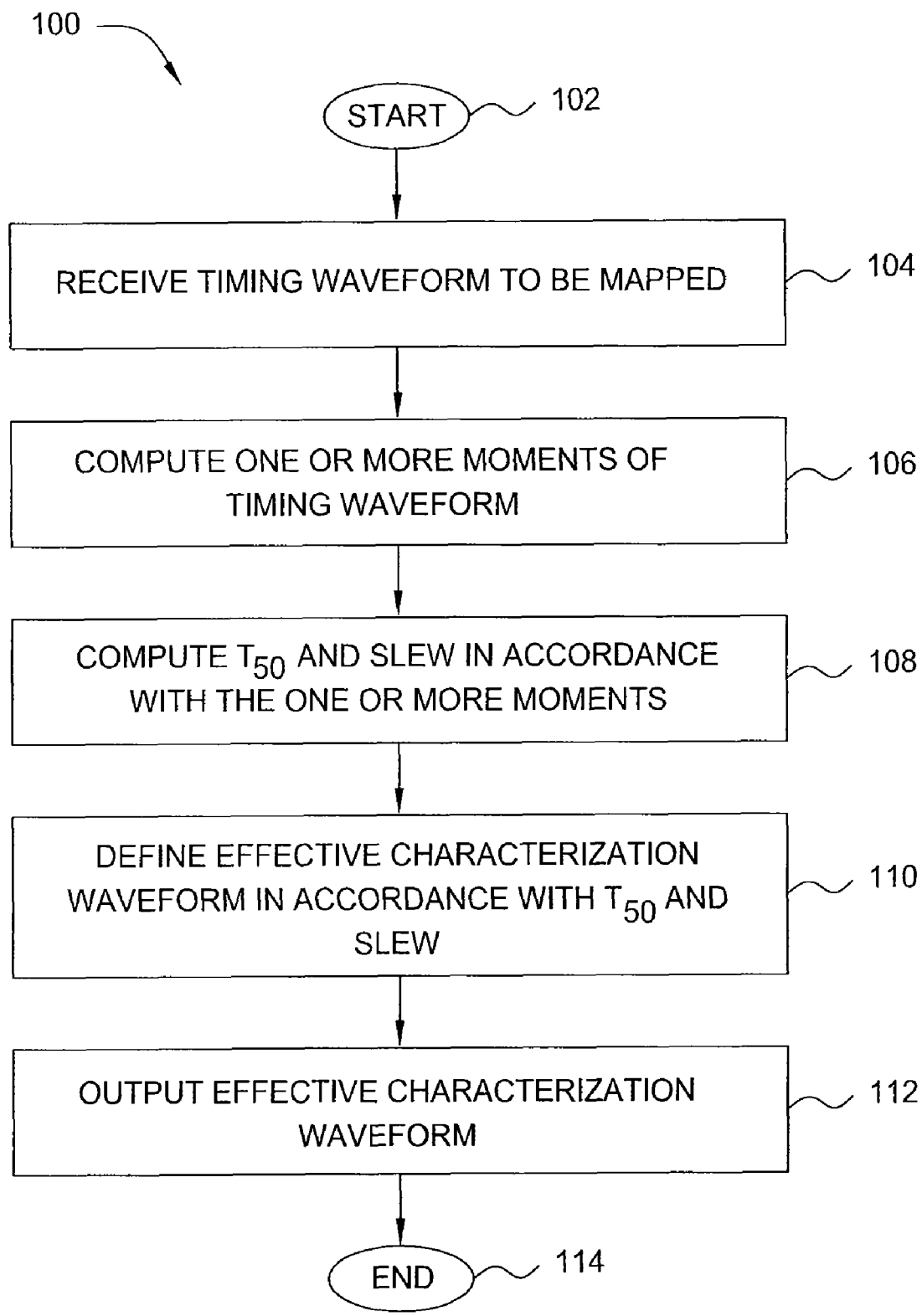
FIG. 1, for example, is a flow diagram illustrating one embodiment of a method for mapping a timing waveform to a characterization waveform, according to the present invention.

In one embodiment, the present invention is a moment-based characterization waveform for static timing analysis. Embodiments of the invention provide a method for mapping timing waveforms that arise in static timing analysis to members of a class of characterization waveforms that are used to characterize gate timing performance during library characterization. Embodiments of this method are based on the moments of the timing waveform, which concisely describe the salient features of the waveform. The mapping between the timing waveform and the effective characterization waveform is in this case accomplished by positing functional relationships between the input waveform's moments and the parameters of the characterization waveform. The unknown coefficients of this functional relationship are determined by minimizing the worst case error of the output waveform over a representative set of input waveforms and gate loads. This technique requires no change to the library characterization process, minimal change to the static timing tool, and little to no additional computational burden on the timer.

In one particular embodiment, the invention is based on the concept of a moment-based "optimal" ramp. This embodiment supposes that the choice of characterization waveform is a saturated ramp. Given an arbitrary timing waveform, the goal is to determine how to best map the timing waveform to a characterization waveform.

For both the saturated ramp and the sine-squared waveform, one can express the characterization waveform in terms of the fifty-percent crossing line and slew as $v_C(t-T_{50}, \text{slew})$. Similarly, the timing waveform can be expressed as $v_T(t)$. The mapping problem then becomes one of finding functional $F_T$ and $F_S$ that map the timing waveform to the values of:

$$T_{50} = F_T[v_T(t)] \qquad \text{(EQN. 1)}$$

$$\text{slew} = F_S[v_T(t)] \qquad \text{(EQN. 2)}$$

In one embodiment, the solution is formulated as an optimization problem, where G denotes a gate (under some load condition) that is driven by the timing waveform $v_T(t)$ and also by the characterization waveform $v_C(t-T_{50}, \text{slew})$. $u_T(t)$ designates the output waveform when the gate G is driven by the timing waveform $v_T(t)$, and $u_C(t-T_{50}, \text{slew})$ is the output waveform when the gate G is driven by the characterization waveform $v_C(t-T_{50}, \text{slew})$. $T_{50}$ and slew are treated as tunable parameters, and values are selected to minimize the L1 norm error between the output waveform $u_T(t)$ and the output waveform $u_C(t-T_{50}, \text{slew})$ such that:

$$E_{L1}(T_{50}, \text{slew}) = \int_{-\infty}^{\infty} dt \left| u_T(t) - u_C(t - T_{50}, \text{slew}) \right| \qquad \text{(EQN. 3)}$$

In one embodiment, the solution to the two-parameter minimization problem embodied in EQN. 3 is obtained by invoking a nonlinear optimizer, such as the derivative-free tuner (DEFT). The solution provides what is referred herein as an "optimal ramp" that agrees more closely with the exact output waveform than does the standard ramp. Specifically, the optimal ramp is selected to result in the most accurate representation of the output waveform over the entire space of input ramp waveforms. The timing accuracy of the optimal ramp is therefore significantly improved in comparison with the standard ramp. However, the optimization problem embodied in EQN. 3 may not be efficient in certain situations, as it requires a full circuit-level optimization within the delay calculator.

A further embodiment of the invention provides an efficient method for mapping an arbitrary timing waveform to a characterization waveform. FIG. 1, for example, is a flow diagram illustrating one embodiment of a method 100 for mapping a timing waveform to a characterization waveform, according to the present invention.

The method 100 is initialized in step 102 and proceeds to step 104, where the method 100 receives the timing waveform $v_T(t)$ to be mapped. In step 106, the method 100 computes one or more moments for the timing waveform $v_T(t)$. The method 100 focuses on static timing analysis and assumes that the timing waveform is either purely monotonic or nearly monotonic. For a monotonic waveform $v(t)$ representing a rising (or falling) transition between ground and supply voltage $V_{dd}$, the quantity:

$$P(t) = \frac{v(t)}{v(\infty) - v(-\infty)} \quad \text{(EQN. 4)}$$

behaves like a probability density function (pdf). That is, $P(t) \geq 0$ for all t, and the area under $P(t)$ is one. Thus, in one embodiment, the moments of the timing waveform $v_T(t)$ are defined in terms of the moments of the pdf $P(t)$ as:

$$m_n[v(t)] \equiv \int_{-\infty}^{\infty} dt P(t) t^n \quad \text{(EQN. 5)}$$

The first moment $m_1$ of the timing waveform $v_T(t)$ describes or locates the timing waveform $v_T(t)$ in time. In other words, the first moment $m_1$ is the mean time of the pdf $P(t)$ (in this terminology, the fifty-percent crossing time is the median). Thus, if the timing waveform $v_T(t)$ is shifted forward in time by an amount T, it first moment $m_1$ will be transformed as $m1 \rightarrow m_1 + T$.

In addition, the timing waveform $v_T(t)$ has a plurality of central moments, any number of which may be defined in accordance with the method 100 to facilitate the mapping. The central moments may be advantageously used for higher-order moments (e.g., $n \geq 2$). In one embodiment, the central moments are defined as:

$$\mu_n[v(t)] \equiv \int_{-\infty}^{\infty} dt P(t)(t - m_1)^n \quad \text{(EQN. 6)}$$

The second central moment, $\mu_2$, represents the variance of the pdf (effectively, the width of the waveform transition, which is related to the slew). The third and fourth central moments, $\mu_3$ and $\mu_4$, respectively represent the skewness (i.e., asymmetry) and the kurtosis (i.e., likelihood of extreme values) of the pdf.

Unlike the first moment, the central moments (i.e., $\mu_2, \ldots, \mu_n$) have the property of being invariant under time translation. That is, if the timing waveform $v_T(t)$ is shifted in time, the central moments will not change. The central moments therefore describe the shape of the timing waveform $v_T(t)$, but not its position in time. It is observed that the third central moment $\mu_3$ (i.e., the skewness) can have a significant impact on the output waveform that is ultimately produced.

In step 108, the method 100 computes a fifty-percent crossing time and a slew in accordance with the one or more moments computed in step 106. In one embodiment, the fifty-percent crossing time and slew are computed from the moments as follows:

$$T_{50} = F_T[v_T(t)] = m_1 + \alpha_2\sqrt{\mu_2} + \alpha_3\sqrt[3]{\mu_3} + \ldots \quad \text{(EQN. 7)}$$

$$\text{slew} = F_S[v_T(t)] = \beta_2\sqrt{\mu_2} + \beta_3\sqrt[3]{\mu_3} + \ldots \quad \text{(EQN. 8)}$$

The roots of the moments are taken so that the coefficients $\{\alpha_2, \beta_2, \alpha_3, \beta_3, \ldots\}$ are dimensionless. Moreover, time translation symmetry demands that the coefficients of $m_1$ in EQNs. 7 and 8 be one and zero, respectively. One embodiment of a method for determining the coefficients $\{\alpha_2, \beta_2, \alpha_3, \beta_3, \ldots\}$ is discussed in further detail with respect to FIG. 3.

In step 110, the method 100 defines the effective characterization waveform in accordance with the T50 and slew computed in step 108. In other words, $v_C(t - T_{50}, \text{slew})$ is used as the effective characterization waveform.

The method 100 outputs the effective characterization waveform (e.g., for use in static timing analysis) in step 112 before terminating in step 114.

Figure 2:
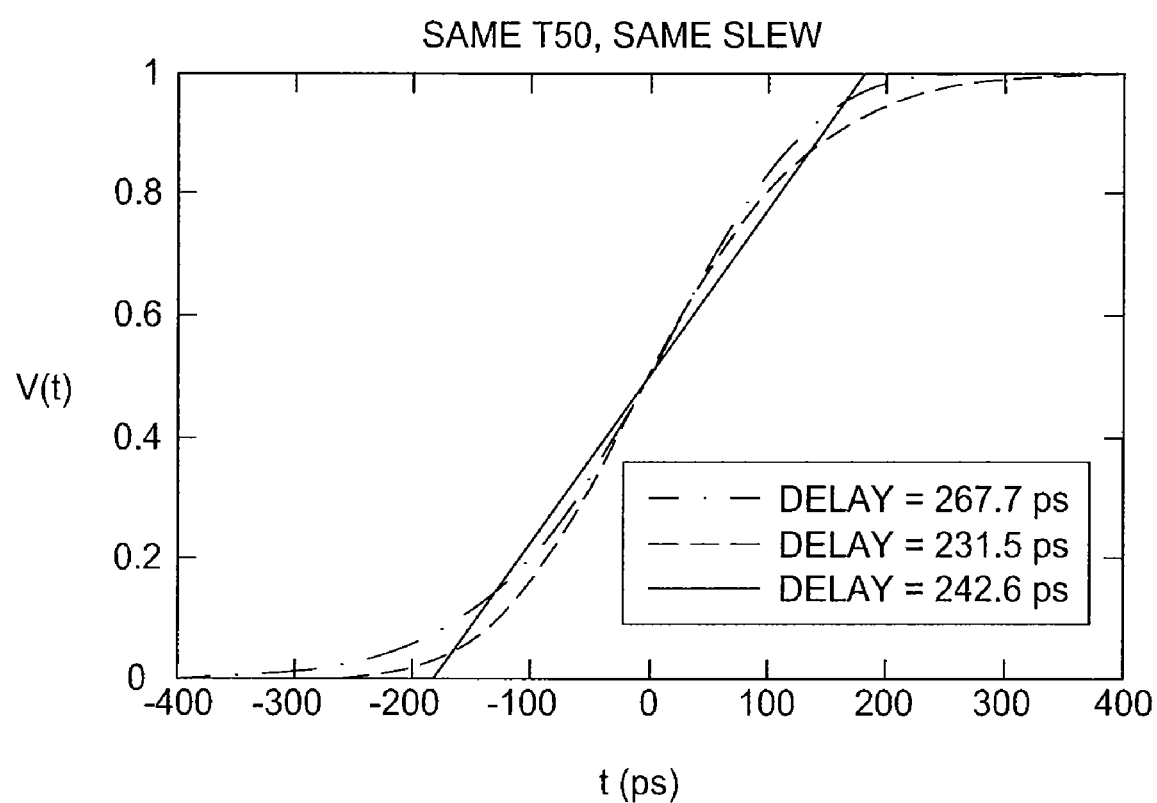
FIG. 2 is a graph illustrating three different waveforms with identical values of fifty-percent crossing time and slew.

FIG. 2 is a graph illustrating three different waveforms with identical values of fifty-percent crossing time ($T_{50}$) and slew. As discussed above, conventional methods using a "standard ramp" would typically assign the same delay value to all three of these waveforms (in the illustrated example, 242.6 ps). However, as illustrated, the actual delays vary from 231.5 ps for the dot-dashed curve to 267.7 ps for the dashed curve. This results in a variation of approximately sixteen percent.

Table I, illustrated below, compares the exact values of the delays for the three waveforms illustrated in FIG. 2 with the delays obtained using the "optimal ramp" of method 100 and the delays obtained using the standard ramp of the conventional method. As illustrated, the delays obtained using the method 100 are much closer to the actual delay values than are the delays obtained using the conventional method.

TABLE I

Delay Results

| Waveform | Exact | Standard Ramp | Optimal Ramp |
|---|---|---|---|
| dashed | 267.7 ps | 242.6 ps | 259.0 ps |
| dot-dashed | 231.5 ps | 242.6 ps | 232.5 ps |

What is more, the numerical computation of the timing waveform moments, as performed by the method 100, is more efficient than the calculation of the crossing times required to determine T50 and slew. This is because the moment computation involves integration over the timing waveform, while the crossing time calculation involves a root-finding procedure.

Moreover, the method 100 may be applied to any choice of characterization waveform, and not just a ramp or sine-squared waveform. This includes simulation-based waveforms. In addition, the functional relationship between $T_{50}$ and slew and the waveform moments need not be the choice made in EQNs. 7 and 8. Any function of the moments may be used, with the coefficients in the function determined in the same manner. Additional moments could also be used in order to increase accuracy.

Figure 3:
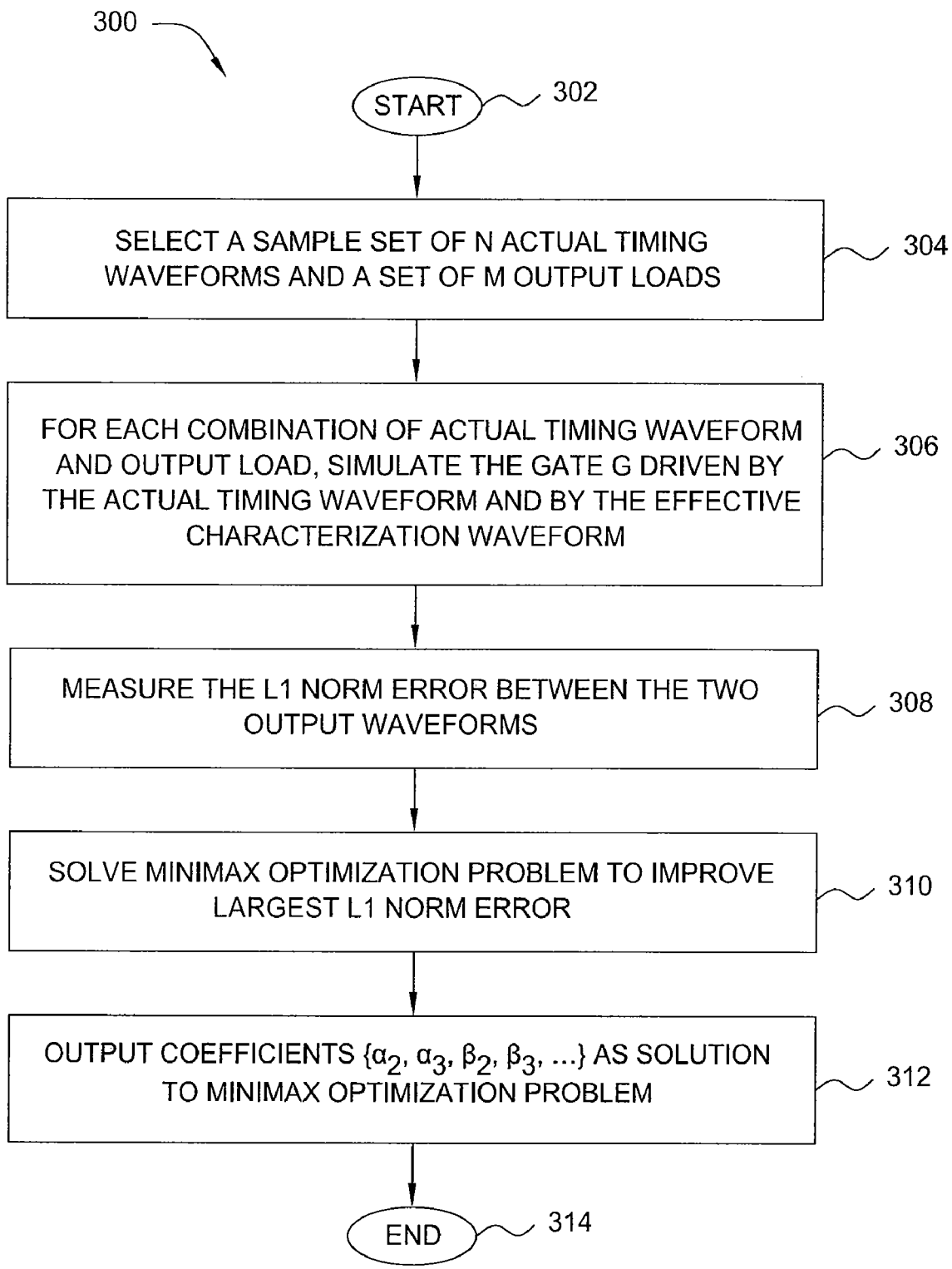
FIG. 3 is a flow diagram illustrating one embodiment of a method for determining the coefficients necessary to compute the fifty-percent crossing time and slew from the moments of a timing waveform, according to the present invention.

FIG. 3 is a flow diagram illustrating one embodiment of a method 300 for determining the coefficients necessary to compute the fifty-percent crossing time and slew from the moments of a timing waveform, according to the present invention. The method 300 may be implemented, for example, in accordance with step 108 of the method 100, discussed above.

As discussed above, computation of the fifty-percent crossing time and slew in accordance with step 108 of the method 100 involves determination of the coefficients $\{\alpha_2, \beta_2, \alpha_3, \beta_3, \ldots\}$. For ease of explanation, moments up to third order are included in EQNs. 7 and 8, and higher-order moments are omitted. This leaves four unknown, dimensionless constants to be determined.

The method 300 is initialized at step 302 and proceeds to step 304, where the method 300 selects a sample set of N actual timing waveforms and a set of M output loads are selected. This results in a total of NM combinations of input waveform and output load.

In step 306, the method 300 simulates, for each combination of input waveform and output load, the gate G driven by the actual timing waveform and by the effective characterization waveform determined by EQNs. 7 and 8.

In step 308, the method 300 measures the L1 norm error between the two output waveforms (i.e., the output waveform associated with the actual timing waveform and the output waveform associated with the effective characterization waveform).

In step 310, the method 300 solves the following minimax optimization problem:

$$\min_{\{\alpha_2, \alpha_3, \beta_2, \beta_3\}} \max_{\{i,j\}} E_{L1}^{ij} \quad \text{(EQN. 9)}$$

where $$E_{L1}^{ij} \equiv \int_{-\infty}^{\infty} dt |u_T^{ij}(t) - u_C^j(t - T_{50}^i, slew^j)| \quad \text{(EQN. 10)}$$

$$T_{50}^i = m_1(i) + \alpha_2 \sqrt{\mu_2(i)} + \alpha_3 \sqrt[3]{\mu_3(i)} \quad \text{(EQN. 11)}$$

$$slew^j = \beta_2 \sqrt{\mu_2(i)} + \beta_3 \sqrt[3]{\mu_3(i)} \quad \text{(EQN. 12)}$$

In EQNs. 9-12, the index i refers to the timing waveform, and the index j refers to the output load. Thus, $u_T^{ij}$ is the output waveform produced by the $i^{th}$ timing waveform and the $j^{th}$ output load. Similarly, $u_C^j(t-T_{50}, slew)$ is the output waveform produced by driving the gate G with the $j^{th}$ output load by the characterization waveform having the parameters $T_{50}$ and slew. For the $i^{th}$ timing waveform, the moments are $m_1(i)$, $\mu_2(i), \mu_3(i), \ldots$. The minimax optimization problem is solved by invoking an optimizer (e.g., the DEFT optimizer) as described above with respect to EQN. 3. A minimax approach as embodied in EQNs. 9-12 focuses the effort of the optimizer on improving the worst outlier (i.e., the largest L1 norm error).

In step 312, the method 300 outputs the solution to the minimax optimization problem. The solution comprises the coefficients $\{\alpha_2, \beta_2, \alpha_3, \beta_3, \ldots\}$, which may be used to obtain an effective $T_{50}$ and slew for any timing waveform driving gate G, as discussed above. The method 300 then terminates in step 314.

In one embodiment, the method 300 is executed for each gate in the gate library. However, it is noted that in some instances, a single set of coefficients $\{\alpha_2, \beta_2, \alpha_3, \beta_3, \ldots\}$ may be sufficient to time a plurality of (or even all) the gates. In such an instance, application of the present invention requires minimal additional labor.

Figure 4:
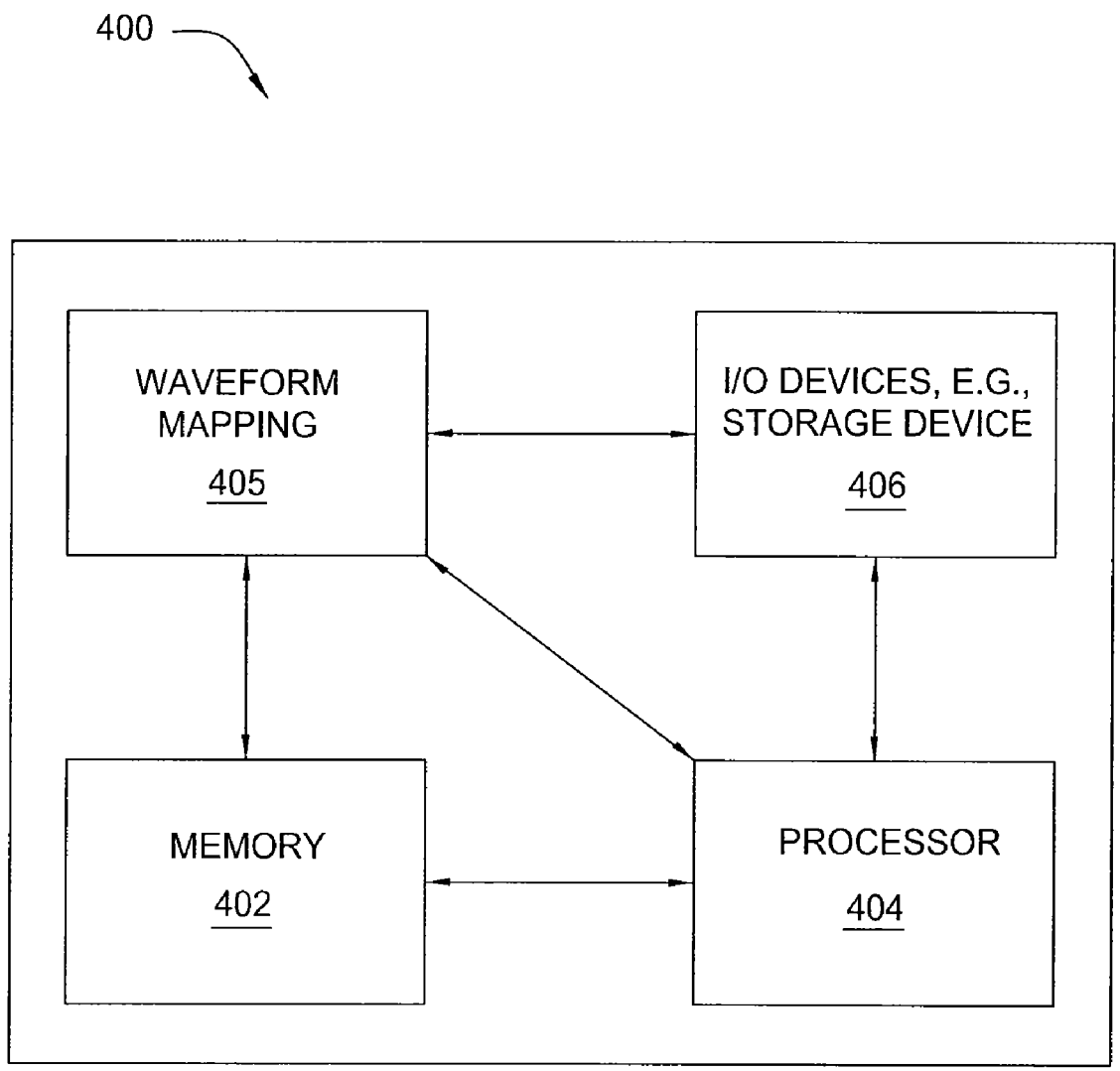
FIG. 4 is a high-level block diagram of the waveform mapping method that is implemented using a general purpose computing device.

FIG. 4 is a high-level block diagram of the waveform mapping method that is implemented using a general purpose computing device 400. In one embodiment, a general purpose computing device 400 comprises a processor 402, a memory 404, a waveform mapping module 405 and various input/output (I/O) devices 406 such as a display, a keyboard, a mouse, a stylus, a wireless network access card, and the like. In one embodiment, at least one I/O device is a storage device (e.g., a disk drive, an optical disk drive, a floppy disk drive, a path selection tool, and/or a test pattern generation tool). It should be understood that the waveform mapping module 405 can be implemented as a physical device or subsystem that is coupled to a processor through a communication channel.

Alternatively, the waveform mapping module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the waveform mapping module 405 for simultaneously sensitizing paths and generating test patterns for mapping a timing waveform to a characterization waveform, as described herein with reference to the preceding Figures, can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for mapping a timing waveform associated with a gate of an integrated circuit to a characterization waveform, the method comprising:
using a processor to perform steps comprising:
computing one or more moments of the timing waveform; and
defining the characterization waveform according to a functional relationship between the one or more moments and one or more parameters of the characterization waveform including a fifty-percent crossing time and a slew, wherein the fifty-percent crossing time and the slew are calculated in accordance with the one or more moments and one or more coefficients, wherein each of the one or more coefficients is associated with one of the one or more moments, and wherein the one or more coefficients are selected by:

simulating the gate driven by one or more combinations of actual timing waveform and output load to generate one or more sample output waveforms;

simulating the gate driven by the characterization waveform to form a characterization output waveform;

measuring an L1 norm error between each of the one of more sample output waveforms and the characterization output waveform, such that at least one L1 norm error is generated; and selecting the one or more coefficients such that a largest one of the at least one L1 norm error is improved.

2. The method of claim 1, wherein the one or more moments are computed by integrating over the timing waveform.

3. The method of claim 1, wherein the one or more moments comprise:

a first moment that describes the timing waveform in time; and at least one central moment that describes a shape of the timing waveform.

4. The method of claim 3, wherein the one or more moments are defined in terms of one or more moments of a probability density function.

5. The method of claim 4, wherein the first moment is a mean time of the probability density function, and wherein a fifty-percent crossing time is a median of the probability density function.

6. The method of claim 4, wherein one of the at least one central moment represents a variance of the probability density function.

7. The method of claim 4, wherein one of the at least one central moment represents a skewness of the probability density function.

8. The method of claim 4, wherein one of the at least one central moment represents a kurtosis of the probability density function.

9. The method of claim 3, wherein the at least one central moment is invariant under time translation.

10. A computer readable storage medium for mapping a timing waveform associated with a gate of an integrated circuit to a characterization waveform, the method comprising:

computing one or more moments of the timing waveform; and defining the characterization waveform according to a functional relationship between the one or more moments and one or more parameters of the characterization waveform including a fifty-percent crossing time and a slew, wherein the fifty-percent crossing time and the slew are calculated in accordance with the one or more moments and one or more coefficients, wherein each of the one or more coefficients is associated with one of the one or more moments, and wherein the one or more coefficients are selected by:

simulating the gate driven by one or more combinations of actual timing waveform and output load to generate one or more sample output waveforms;

simulating the gate driven by the characterization waveform to form a characterization output waveform;

measuring an L1 norm error between each of the one of more sample output waveforms and the characterization output waveform, such that at least one L1 norm error is generated; and selecting the one or more coefficients such that a largest one of the at least one L1 norm error is improved.

11. The computer readable storage medium of claim 10, wherein the one or more moments are computed by integrating over the timing waveform.

12. The computer readable storage medium of claim 10, wherein the one or more moments comprise:

a first moment that describes the timing waveform in time; and at least one central moment that describes a shape of the timing waveform.

13. The computer readable storage medium of claim 12, wherein the one or more moments are defined in terms of one or more moments of a probability density function.

14. The computer readable storage medium of claim 13, wherein the first moment is a mean time of the probability density function, and wherein a fifty-percent crossing time is a median of the probability density function.

15. The computer readable storage medium of claim 13, wherein one of the at least one central moment represents a variance of the probability density function.

16. The computer readable storage medium of claim 13, wherein one of the at least one central moment represents a skewness of the probability density function.

17. The computer readable storage medium of claim 13, wherein one of the at least one central moment represents a kurtosis of the probability density function.

18. The computer readable storage medium of claim 12, wherein the at least one central moment is invariant under time translation.

* * * * *